(12) United States Patent
Ehleuter

(10) Patent No.: US 11,683,007 B2
(45) Date of Patent: Jun. 20, 2023

(54) DEVICE FOR TREATING SMOOTH SURFACES, IN PARTICULAR THE SURFACE OF PHOTOVOLTAIC AND SOLAR SYSTEMS

(71) Applicant: Franz Ehleuter, Lachen (DE)

(72) Inventor: Franz Ehleuter, Lachen (DE)

( * ) Notice: Subject to any disclaimer, the term of this patent is extended or adjusted under 35 U.S.C. 154(b) by 460 days.

(21) Appl. No.: 16/816,997

(22) Filed: Mar. 12, 2020

(65) Prior Publication Data

US 2020/0295702 A1 Sep. 17, 2020

(30) Foreign Application Priority Data

Mar. 13, 2019 (DE) ...................... 20 2019 101 423.7

(51) Int. Cl.
*H02S 40/10* (2014.01)
*B05B 3/12* (2006.01)
*B08B 3/02* (2006.01)
*B08B 11/04* (2006.01)

(52) U.S. Cl.
CPC ................ *H02S 40/10* (2014.12); *B05B 3/12* (2013.01); *B08B 3/024* (2013.01); *B08B 11/04* (2013.01)

(58) Field of Classification Search
CPC . B05B 3/12; B08B 3/024; B08B 11/04; H02S 40/10
See application file for complete search history.

(56) References Cited

U.S. PATENT DOCUMENTS

| | | | | |
|---|---|---|---|---|
| 9,400,123 B1 * | 7/2016 | Barna | ...................... | F24S 40/20 |
| 10,305,419 B1 * | 5/2019 | Shugar | ................... | F24S 40/20 |
| 10,797,637 B2 * | 10/2020 | Novotny | ................... | B08B 5/02 |
| 2014/0115815 A1 * | 5/2014 | Lu | ............................ | F24S 40/20 15/320 |
| 2015/0229265 A1 * | 8/2015 | Morita | ..................... | F24S 40/20 701/23 |
| 2016/0178241 A1 * | 6/2016 | Jeanty | ..................... | F24S 40/20 15/250.003 |
| 2017/0063293 A1 * | 3/2017 | Parrott | ................... | B08B 1/002 |
| 2018/0316303 A1 * | 11/2018 | Bailey | ..................... | H02S 40/10 |

FOREIGN PATENT DOCUMENTS

DE   20 2011 105493 U1   12/2011
WO   2011/029416 A1   3/2011

OTHER PUBLICATIONS

European Search Report and Written Opinion dated Aug. 3, 2020 for Application No. EP 20 15 3367.6.
European Examination Communication dated Apr. 21, 2021 for Application No. EP 20 15 3367.6.

* cited by examiner

*Primary Examiner* — Christopher R Harmon
(74) *Attorney, Agent, or Firm* — Paul D. Bianco; Stephen Bongini; Fleit Intellectual Property Law

(57) ABSTRACT

A device for treating smooth surfaces includes a treatment unit, a support structure with a pivoting support arm for positioning and holding the treatment unit and a load balancer for setting and automatically controlling the contact pressure acting on the surface to be treated by the treatment unit. The treatment unit in the form of a spraying device includes at least one support roller or support wheel for supporting the treatment unit against the surface to be treated.

15 Claims, 3 Drawing Sheets

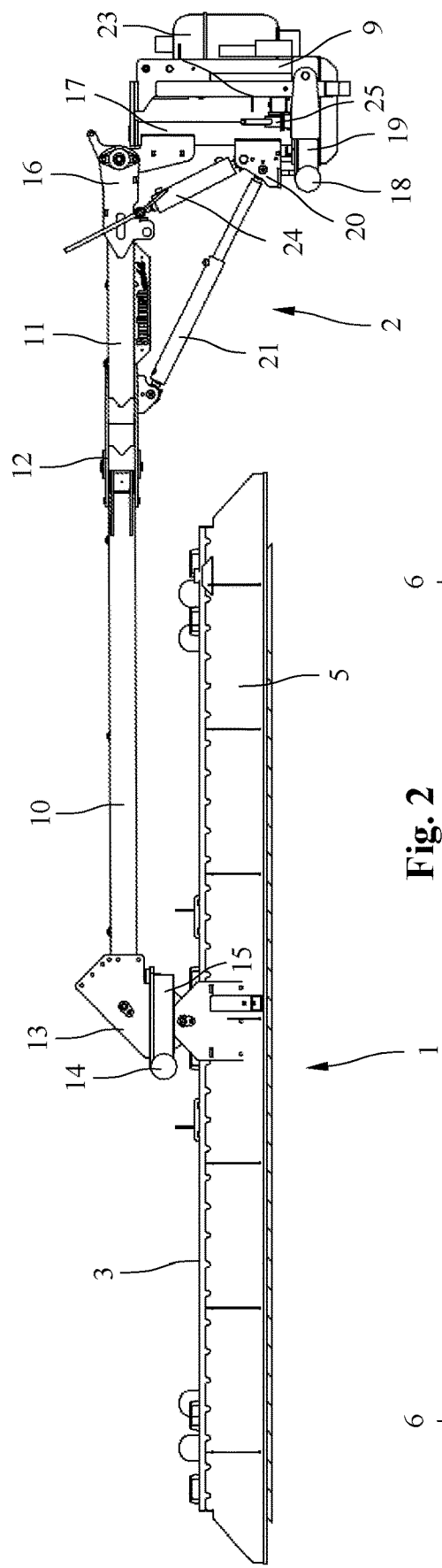
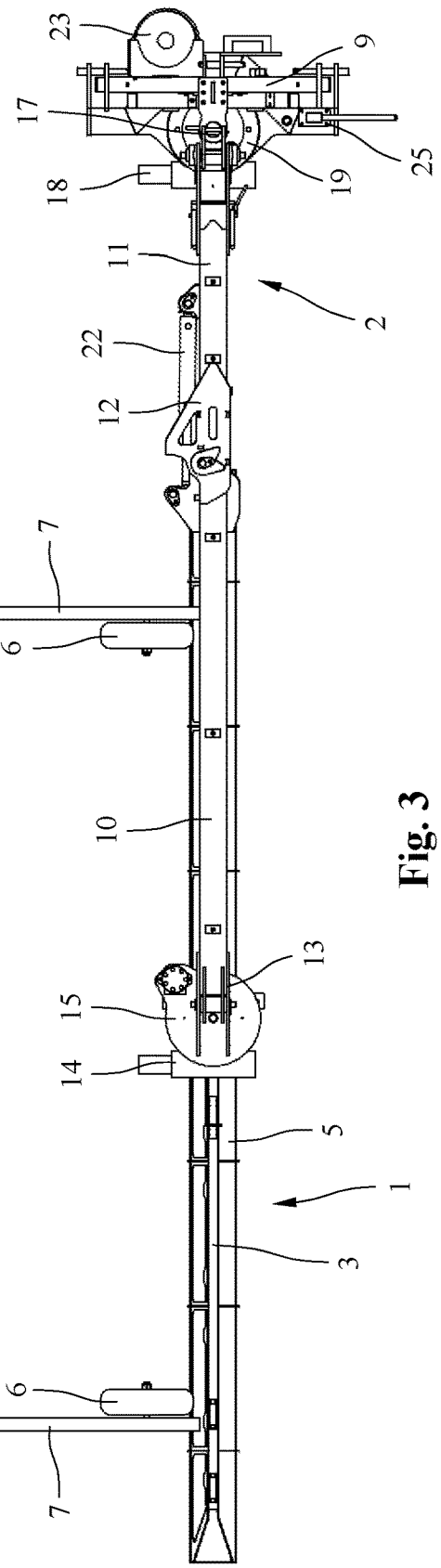
Fig. 2
Fig. 3

DEVICE FOR TREATING SMOOTH SURFACES, IN PARTICULAR THE SURFACE OF PHOTOVOLTAIC AND SOLAR SYSTEMS

FIELD OF THE DISCLOSURE

The disclosure relates to a device for treating smooth surfaces, in particular the surface of solar systems, photovoltaic systems, glass roofs or glass facades.

BACKGROUND

A treatment device of this type is known from DE 20 2011 105 493 U1. This device comprises a cleaning unit with a cleaning brush, which is rotatably mounted on a load-bearing support and which is rotated about its longitudinal axis by a drive, and a support structure with a pivotable support arm for positioning and holding the cleaning unit. The cleaning device also comprises a load balancer, by means of which the pressure acting on the surface to be cleaned by the cleaning brush can be not only set to but also maintained at the desired value when a vehicle transporting the cleaning device is driven over ground surface irregularities during the cleaning procedure. Thus, undesired damage to the surfaces that are to be cleaned can be avoided.

SUMMARY

One aspect of the disclosure relates to a device for treating smooth surfaces, which makes it possible to optimally apply fluids or other media to smooth surfaces.

Expedient embodiments and advantageous refinements are also disclosed.

The device according to the disclosure comprises at least one support wheel for supporting the treatment unit on the surface to be treated, which support wheel is disposed on the treatment unit designed in the form of a spraying unit comprising a spraying device. By means of the load balancer and the support wheel or the support wheels or support rollers, pressure acting on the surface to be cleaned by the treatment unit can be not only set to but also maintained at the desired value when a vehicle transporting the treatment device is driven over ground surface irregularities during the treatment procedure. As a result, the quality of the treatment can be optimized. In addition, damage to the surfaces treated by the treatment unit can be prevented.

To ensure an optimum pressure distribution, a plurality of support rollers or support wheels located upstream of the spraying device, as viewed in the direction of movement, are preferably disposed on the treatment unit. The support rollers or support wheels can favorably be rotatably mounted on supports which project at right angles from a supporting tube of the treatment unit. The support rollers or support wheels are preferably adjustably disposed on the supports. This allows, e.g., the height or the distance between the support rollers or support wheels to be changed or to be adapted to the requirements prevailing at the time.

According to another favorable embodiment of the disclosure, the treatment unit can be rotatably mounted on the supporting arm of the support structure via a drive. This allows the treatment unit to be oriented such that the support rollers or support wheels are disposed upstream of the spraying device as viewed in the direction of movement.

The spraying device can preferably be disposed on the lower surface of the supporting tube. A housing for shielding the spraying device can be provided on the supporting tube.

The supporting arm of the support structure can be rotatably mounted on a carrying frame via a rotary drive. The drive for rotating the treatment unit and the rotary drive for rotating the supporting arm can preferably be encapsulated and completely enclosed by an associated housing so that the drive elements are optimally protected against soiling or damage.

BRIEF DESCRIPTION OF THE DRAWINGS

Additional characteristic features and advantages of the disclosure follow from the description of a preferred embodiment example below with reference to the drawings. The drawings show:

FIG. 2 a lateral view of the device for treating smooth surfaces as shown in FIG. 1;

FIG. 3 a plan view of the device for treating smooth surfaces as shown in FIG. 1, and FIG. 4 a front view of the device for treating smooth surfaces as shown in FIG. 1.

DETAILED DESCRIPTION

The device for treating smooth surfaces, in particular the surface of photovoltaic systems and solar systems, glass roofs or glass facades, diagrammatically shown in different views in FIGS. 1 to 4, is designed to be mounted on a tractor or another suitable vehicle. The device comprises a treatment unit 1 which can be positioned above the surface to be treated and a support structure 2 for positioning and holding the treatment unit 1.

Figure 4:
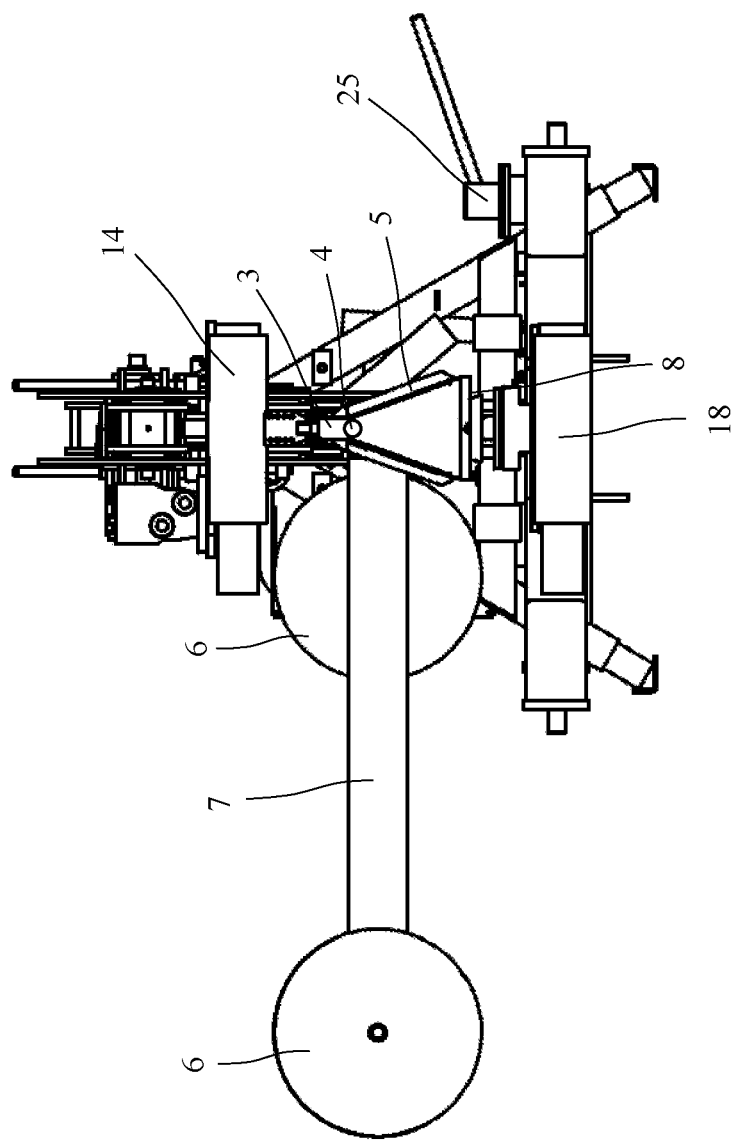

In the embodiment shown, the treatment unit 1 is designed in the form of a spraying unit having a supporting tube 3 approximately 4 m in length and a spraying device 4, which can be seen in FIG. 4. As FIG. 4 indicates, the spraying device 4 can be, e.g., a spraying tube with downwardly open spraying nozzles for spraying a fluid or another medium onto the surface of photovoltaic and solar panels or the like, which spraying tube is disposed on the lower surface of the supporting tube 3. A downwardly open housing 5 for shielding the spraying device 4 is disposed on the supporting tube 3. The purpose of this housing 5 is to prevent the fluid sprayed downwardly by the spraying device 4 from being uncontrollably distributed by the flow of air around the driving vehicle.

In the embodiment examples shown, the treatment unit 1 comprises a plurality of support rollers or support wheels 6 for supporting the treatment unit 1 on the surface to be treated, which support rollers or support wheels are disposed upstream of the supporting tube 3 and the spraying device 4 as viewed in the direction of movement. The support rollers or support wheels 6 are rotatably mounted on supports 7 which are disposed at right angles relative to the supporting tube 3. In the embodiment shown, two supports 7 projecting perpendicularly from the supporting tube 3, each having two support rollers or support wheels 6 arranged on opposite sides from one another, are disposed on the treatment unit 1. The support rollers or support wheels 6 can be adjustably disposed on the supports 7 in such a manner that both the height of the support rollers or support wheels 6 relative to the supports 7 and the distance between the support rollers or support wheels 6 relative to each other can be changed.

As indicated in FIG. 4, the support 7 and the support rollers or support wheels 6 are designed and disposed in such a manner that, as the support rollers or support wheels 6 are being placed onto a surface, a distance between a lower surface 8 of the housing 5 and the surface to be treated is maintained. This prevents the surfaces to be treated from being damaged by the housing 5 of the treatment unit 1.

The support structure 2 comprises a supporting arm which is pivotally mounted on a carrying frame 9 and which, in the embodiment shown, consists of two arm components 10 and 11 which are connected to one another in articulated fashion. The two arm components 10 and 11 are connected to one another by means of a pivot joint 12 in such a manner that the outer arm component 11 with the treatment unit 1 mounted thereon can be folded in for transport purposes. On the front end of the outer arm component 11, the supporting tube 3 of the treatment unit 1 is rotatably mounted on a motor 14 and a gear mechanism 15 via a bracket 13 and a rotary drive. Via the rotary drive with the motor 14 and the gear mechanism 15, the supporting tube 3 of the treatment unit 1 can be oriented such that the support rollers or support wheels 6 are disposed upstream of the supporting tube 3 as viewed in the direction of movement of said supporting tube.

Figure 1:
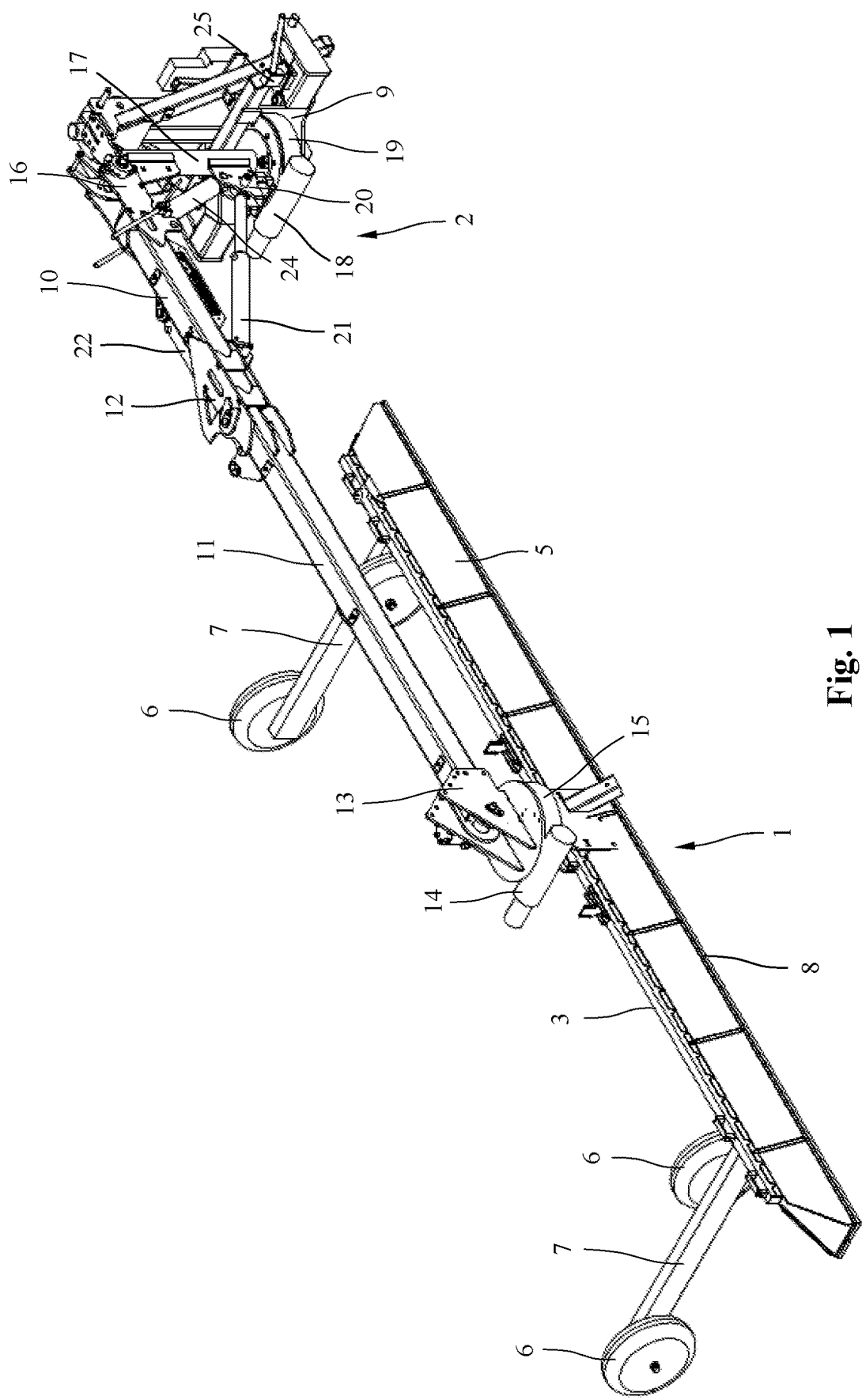
FIG. 1 a perspective view of a device for treating smooth surfaces according to the disclosure.

On the upper end of a load-bearing support 17, which rotates about a vertical axis, the inner arm component 10 of the supporting arm is pivotably hinged about a horizontal axis via an articulation component 16. The tubular load-bearing support 17 is rotatably mounted about a vertical axis on the carrying frame 9 and can be rotated by means of a drive formed by a motor 18 and a gear mechanism 19. This allows the supporting arm with the treatment unit 1 disposed thereon to be laterally pivoted into a desired position. The inner arm component 10 of the supporting arm is braced against the load-bearing support 17 by means of a lifting cylinder 21 disposed between a retaining part 20 on the lower end of the load-bearing support 17 and the inner arm component 10. The height of the supporting arm can be adjusted by means of the lifting cylinder 21. An articulated cylinder 22, visible in FIG. 1, is disposed between the inner arm component 10 and the outer arm component 11. By means of the carrying frame 9, which is configured in the form of a three-point suspension system, it is possible to position the device for treating smooth surfaces, e.g., on the front end of a tractor, which is generally fitted with a three-point trailer coupling, or on another suitable vehicle.

Furthermore, as indicated in FIG. 3, a load balancer is disposed on the support structure 2, by means of which the pressure acting on the surface to be treated by the treatment unit 1 via the support wheels 6 can be not only set to a desired value but also maintained if a vehicle transporting the cleaning device is being driven over ground surface irregularities during the cleaning procedure. The supporting arm holding the treatment unit 1 is automatically readjusted by the load balancer so that an adjustment of the level relative to the ground can take place, and the bearing pressure or contact pressure of the treatment unit 1 can be held constant regardless of potentially encountered ground surface irregularities. Thus, damage to the surfaces to be cleaned can be prevented.

The load balancer is formed by a pressure reservoir 23 disposed on the carrying frame 9 and shown in FIGS. 2 and 3 and an associated compensating cylinder 24. By means of the compensating cylinder 24 which is disposed between the inner arm component 10 and the load-bearing support 17, the supporting arm is braced against the load-bearing support 14. The pressure reservoir 23 has the form of a pressure tank which is actuated in part with hydraulic fluid and in part with air or another gaseous medium. The contact pressure can be set by means of a hand pump 25. Because the pressure reservoir 23 is connected to the compensating cylinder 24, it is possible to ensure load balancing and an adjustment relative to the ground level.

The motors 14 and 18, as well as the gear mechanism 15 and 19, are encapsulated and completely enclosed by an associated housing, thereby ensuring that the drive elements are optimally protected against soiling or damage. Thus, dust or dirt raised by the cleaning element during the cleaning procedure is prevented from entering the drive, thereby eliminating the cause of potential malfunctions. The gear mechanisms 15 and 19 are preferably self-locking gear mechanisms. In this manner, a high degree of security against an undesired displacement of the supporting arm can be achieved.

The field of application of the treatment device described above is not limited solely to the treatment of solar or photovoltaic systems. The device can also be used to apply a variety of media to relatively large window surfaces or facades.

LIST OF REFERENCE CHARACTERS

1 Treatment unit
2 Support structure
3 Supporting tube
4 Spraying device
5 Housing
6 Support roller or support wheel
7 Support
8 Lower surface of the housing
9 Carrying frame
10 Inner arm component
11 Outer arm component
12 Articulation member
13 Bracket
14 Motor
15 Gear mechanism
16 Articulation component
17 Load-bearing support
18 Motor
19 Gear mechanism
20 Retaining part
21 Lifting cylinder
22 Articulated cylinder
23 Pressure reservoir
24 Compensating cylinder
25 Hand pump

The invention claimed is:

1. A device for treating smooth surfaces, the device comprising:
   a treatment unit including a spraying unit that comprises a supporting tube and a spraying device, the spraying device being disposed on the supporting tube, and the treatment unit further including at least one support roller or support wheel for supporting the weight of the treatment unit on the surface to be treated;
   a support structure including a pivotable support arm for positioning and holding the treatment unit;
   a rotary drive disposed on the support arm, with the supporting tube of the treatment unit rotatably mounted on the support arm of the support structure via the rotary drive so that the supporting tube is rotatable via the rotary drive so as to dispose the at least one support roller or support wheel upstream of the supporting tube; and
   a load balancer comprising a compensating cylinder connected to the support arm, the load balancer automatically adjusting the support arm to automatically control a contact pressure acting on the surface to be treated by the at least one support roller or support wheel of the treatment unit so that the contact pressure is held constant.

2. The device of claim 1, wherein the at least one support roller or support wheel is pivotally mounted on at least one support projecting at a right angle from the supporting tube of the treatment unit.

3. The device of claim 2, wherein the at least one support roller or support wheel is adjustably disposed on the at least one support.

4. The device of claim 2, wherein the spraying device is disposed on a lower surface of the supporting tube.

5. The device of claim 2, wherein a housing for shielding the spraying device is disposed on the supporting tube.

6. The device of claim 1, wherein via a second rotary drive, the support arm is rotatably mounted on a carrying frame.

7. The device of claim 1, wherein the support arm comprises an inner arm component and an outer arm component articulated to said inner arm component.

8. The device of claim 7, wherein via an articulation member, the inner arm component is pivotally articulated about a horizontal axis to a load-bearing support which pivots about a vertical axis.

9. The device of claim 1, wherein the load balancer further comprises a pressure reservoir, and the compensating cylinder is connected to the pressure reservoir.

10. The device of claim 1, wherein the rotary drive comprises a motor and a gear mechanism.

11. The device of claim 10, wherein the load balancer further comprises a pressure reservoir containing hydraulic fluid, and the compensating cylinder is connected to the pressure reservoir.

12. The device of claim 1, wherein the at least one support roller or support wheel comprises a plurality of support rollers or support wheels.

13. A device for treating smooth surfaces, the device comprising:
    a treatment unit including a spraying unit that comprises a supporting tube and a spraying device, the spraying device being disposed on the supporting tube, and the treatment unit further including at least one support roller or support wheel that supports the weight of the treatment unit on the surface to be treated;
    a support structure including a pivotable support arm for positioning and holding the treatment unit;
    a rotary drive disposed on the support arm, the supporting tube of the treatment unit being rotatably mounted on the support arm of the support structure via the rotary drive so that the supporting tube is rotatable via the rotary drive so as to dispose the at least one support roller or support wheel upstream of the supporting tube in the direction of movement of the supporting tube during treatment; and
    a load balancer comprising a compensating cylinder connected to the support arm, the load balancer automatically readjusting the support arm of the treatment unit so as to automatically maintain during treatment a contact pressure of the at least one support roller or support wheel acting on the surface to be treated, so that this contact pressure is held constant.

14. The device of claim 13, wherein the rotary drive comprises a motor and a gear mechanism.

15. The device of claim 13, wherein the load balancer further comprises a pressure reservoir containing hydraulic fluid, and the compensating cylinder is connected to the pressure reservoir.

* * * * *